(12) United States Patent
Bunte et al.

(10) Patent No.: US 10,069,641 B2
(45) Date of Patent: Sep. 4, 2018

(54) METHOD FOR OPERATING A COMMUNICATION NETWORK AND COMMUNICATION NETWORK

(71) Applicant: Beckhoff Automation GmbH, Verl (DE)

(72) Inventors: Thorsten Bunte, Gütersloh (DE); Holger Büttner, Berlin (DE); Erik Vonnahme, Salzkotten (DE); Dirk Janssen, Verl (DE); Thomas Rettig, Rheda-Wiedenbrück (DE); Hans Beckhoff, Verl (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 49 days.

(21) Appl. No.: 14/684,169

(22) Filed: Apr. 10, 2015

(65) Prior Publication Data
US 2015/0295727 A1 Oct. 15, 2015

(30) Foreign Application Priority Data

Apr. 11, 2014 (DE) .......................... 10 2014 105 207

(51) Int. Cl.
*H04L 12/28* (2006.01)
*H04L 12/18* (2006.01)
*H04L 12/58* (2006.01)
*H04L 29/12* (2006.01)

(52) U.S. Cl.
CPC ...... *H04L 12/1854* (2013.01); *H04L 12/1886* (2013.01); *H04L 51/063* (2013.01); *H04L 51/14* (2013.01); *H04L 61/2069* (2013.01)

(58) Field of Classification Search
CPC ............. H04L 12/1854; H04L 61/2069; H04L 12/1886; H04L 51/063; H04L 51/14
USPC ......... 370/232–241, 359–509; 709/223–241; 710/110–119
See application file for complete search history.

(56) References Cited

U.S. PATENT DOCUMENTS

| 7,668,994 | B2 |  | 2/2010 | Albrecht et al. |
| 8,144,718 | B2 | * | 3/2012 | Schwenkel .......... G05B 19/042 370/408 |
| 8,391,317 | B2 | * | 3/2013 | Rainer .............. H04L 12/40032 370/445 |
| 9,148,297 | B2 | * | 9/2015 | Maruyama ........ H04L 12/40176 |
| 9,438,537 | B2 | * | 9/2016 | Edmiston ................ H04L 49/90 |
| 9,621,483 | B2 | * | 4/2017 | Rahamim ............. H04L 12/437 |
| 2003/0117899 | A1 | * | 6/2003 | Eidson ..................... G04G 5/00 368/46 |
| 2006/0245454 | A1 | * | 11/2006 | Balasubramanian ........ H04L 12/4625 370/509 |

(Continued)

FOREIGN PATENT DOCUMENTS

DE 102004063213 A1 6/2006
EP 1748338 A1 1/2007

*Primary Examiner* — Man Phan
(74) *Attorney, Agent, or Firm* — Dorsey & Whitney LLP (57) ABSTRACT

A method for operating a communication network comprising a master and a number of subscribers. A message comprising a data field is transmitted by the master, wherein at least one of the subscribers, on receiving the message, reads data out of the data field of the message, and forwards the message to at least one other one of the subscribers after the readout, and wherein the at least one other one of the subscribers, on receiving the message, writes data into the data field.

17 Claims, 3 Drawing Sheets

(56) References Cited

U.S. PATENT DOCUMENTS

| | | | |
|---|---|---|---|
| 2010/0088442 A1* | 4/2010 | Kuschke | H04L 12/40189 710/110 |
| 2010/0168877 A1* | 7/2010 | Begey | G05B 9/03 700/82 |
| 2010/0241773 A1* | 9/2010 | Rostan | H04L 12/403 710/110 |
| 2011/0205886 A1 | 8/2011 | Maruyama et al. | |
| 2013/0173868 A1* | 7/2013 | Leyrer | G06F 12/1483 711/152 |
| 2015/0172220 A1* | 6/2015 | Rahamim | H04L 12/437 370/389 |
| 2015/0293871 A1* | 10/2015 | Rahamim | H04L 12/437 710/106 |

* cited by examiner

Fig. 5

METHOD FOR OPERATING A COMMUNICATION NETWORK AND COMMUNICATION NETWORK

CROSS-REFERENCE TO RELATED APPLICATION

The application claims priority to German Patent Application DE 10 2014 105 207.2, filed 11 Apr. 2014, entitled VERFAHREN ZUM BETREIBEN EINES KOMMUNIKATIONSNETZWERKS UND KOMMUNIKATIONSNETZWERK, which is incorporated by reference herein, in the entirety and for all purposes.

FIELD

The invention relates to a method for operating a communication network comprising a number of subscribers. The invention further relates to a communication network.

BACKGROUND

In order to implement acyclic communication in an Ethernet network, for example in an EtherCAT network according to IEC Standard "IEC 61158" in such a manner that the cyclic real-time communication is not disturbed, there are usually two options. In option 1, a master controls the complete acyclic communication, that is to say that the acyclic messages which must be transmitted from a slave to the master, are also fetched from the master (for example in an EtherCAT communication network known from the prior art). In the second option, phases are specified in which acyclic communication is allowed to take place (for example in a PROFINET IRT communication network also known from the prior art). In option 1, the line cannot be used in both directions during the transmission of the acyclic messages since either an acyclic message is transmitted to the slave (write, the returning message is without content in this case), or read by the slave (read, the incoming message is unused in this case). In option 2, overload situations can easily occur since a number of slaves have to send messages at the same time. In addition, the configuration of the various phases is complex.

In cyclic communication, the data transmission is performed in iterative, equally long time intervals, the cycles. Cyclic communication occurs usually in each cycle again and again in the same manner, for example for the exchange of process data (inputs/outputs) but also for status monitoring. The exchanged volume of data between individual subscribers is in each case rather low; as a rule, real-time requirements are present.

Acyclic communication, as a rule, does not occur in each cycle but usually only as required. On the other hand, the volume of data is frequently greater than in the case of process data; the transmission has no or only few real-time requirements. The greater volume of data must frequently be transmitted in relatively small units between the cyclic data in order not to impair their real-time requirements.

SUMMARY

The present invention provides an improved method for operating a communication network comprising a number of subscribers.

The present invention provides an improved communication network.

According to one aspect, for operating a communication network comprising a master and a number of subscribers, a message comprising a data field is transmitted by the master, wherein at least one of the subscribers, on receiving the message, reads data out of the data field of the message, and forwards the message to at least one other one of the subscribers after the readout, and wherein the at least one other one of the subscribers, on receiving the message, writes data into the data field.

According to another aspect, a communication network comprises a master and a number of subscribers, the master and the subscribers being connected to one another via a data line. The master comprises a transmit interface to the data line by means of which the master sends a message to the subscribers and a receive interface to the data line by means of which the master receives the message from the subscribers after passing through the subscribers. The message comprises a data field. At least one of the subscribers, on receiving the message, reads data out of the data field of the message and forwards the message after the readout to at least one other one of the subscribers, wherein the at least one other one of the subscribers, on receiving the message, writes data into the data field of the message.

According to another aspect, for operating a communication network comprising a master and a number of subscribers, the master transmits a message to the subscribers, the message comprising a data field and at least two address fields associated with a data field, one address field indicating a first subscriber which is to read data out from the data field and the other address field indicating second subscriber which is to write data into the data field, wherein the second subscriber being located downstream of the first subscriber with respect to a running direction of the message.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In the text which follows, identical reference symbols can be used for identical features.

Figure 1:
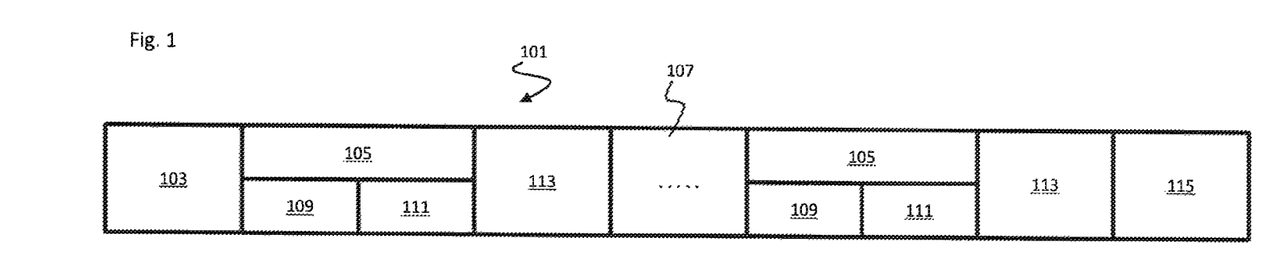
FIG. 1 shows an EtherCAT message.

FIG. 1 shows an EtherCAT message 101.

The EtherCAT message 101 comprises an Ethernet head section 103, also called Ethernet header. Furthermore, the EtherCAT message 101 comprises a number of datagrams 105. Two datagrams are shown explicitly. The reference symbol 107 points to a box of the EtherCAT message 101 in which five points are drawn. This is intended to show symbolically that, instead of the box 107, further datagrams 105 can be provided.

The datagrams 105 in each case comprise a datagram head section 109, also called datagram header. The datagram head section 109 comprises a destination address (i.e. an address field with a destination address of a subscriber) of a subscriber of a communication network, wherein the datagram 105 having the datagram head section 109 corresponding to the destination address is intended. Furthermore, the datagram head section 109 comprises a command or a number of commands which the subscriber having the destination address is to execute.

Furthermore, the datagrams 105 comprise in each case data 111 for the subscriber having the corresponding destination address. Furthermore, the datagrams 105 comprise in each case a counter 113, also called working counter, which indicates whether processing of the corresponding datagram 105 by means of the subscriber having the corresponding destination address was successful. It is preferably possible to address one or a number of subscribers by means of each datagram 105.

The EtherCAT message 101 comprises also a checksum 115 which can be formed, for example, over the data 111. The checksum 115 can be, for example, a CRC (Cyclic Redundancy Check) checksum.

Figure 2:
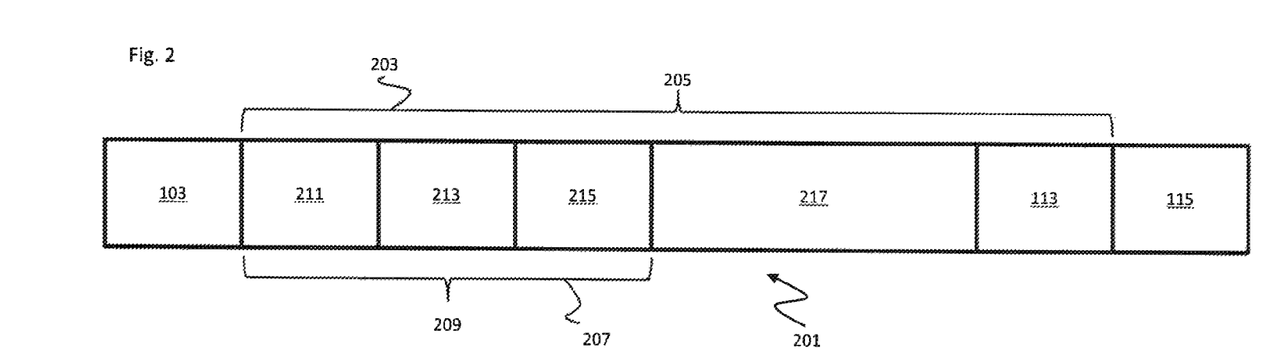
FIG. 2 shows an EtherCAT message with a data field.

FIG. 2 shows a further EtherCAT message 201.

Analogously to the EtherCAT message 101 of FIG. 1, the EtherCAT message 201 comprises an Ethernet head section 103. The curved bracket with the reference symbol 203 comprises or points to a datagram 205 of the EtherCAT message 201. The curved bracket with the reference symbol 207 comprises or points to a datagram head section 209 or datagram header of the datagram 205. The datagram head section 209 comprises a command field 211, a first address field 213 and a second address field 215. The datagram 205 comprises also a data field 217 into which data can be written and out of which data can be read. In this context, the first address field 213 comprises an address of a first subscriber of an EtherCAT communication network, which is to read data out of the data field 217. The second address field 215 comprises an address of a second subscriber of the EtherCAT communication network which is to write data into the data field 217. The command field 211 comprises a command which orders the first subscriber to read data out of the data field 217 and which orders the second subscriber to write data into the data field 217. The command can be, for example, an FMRW command. "FMRW" stands for the terms: Fixed address Multiple Read Write. In this context, it is preferably provided that the first subscriber reads the data out of the data field 217 so that the data field 217 is empty after the reading of the data. The second subscriber thus writes data into an empty data field 217. The message 201 also comprises a checksum 115 which, in particular, can be formed over the data in the data field 217. The checksum 115 can be, for example, a CRC checksum 115. The order of the individual elements (address field and command field) or components of the datagram head section 209 can be, for example, arbitrary and does not necessarily have to correspond to the order shown in FIG. 2. This order shown is only exemplary but not restrictive. This also applies to the datagram head section 109 of FIG. 1. The command in the command field 211 can be, for example, a read, write or read/write command or an arbitrary combination thereof, in each case with different addressing types, that is to say with addresses which subscriber is to execute which command.

Furthermore, the datagram 205 comprises a counter 113, that is to say a working counter which indicates whether a write process into a read process from the data field 217 has been carried out successfully. For this purpose, it is preferably provided that the counter 113 is incremented after a successful write process and after a successful read process. In particular, in the case of only one counter 113, the counter 113 is incremented with different increments in dependence on whether writing into the data field 217 or reading out of the data field 217 was successful.

In an embodiment, two counters 113 can be provided, one of the two counters being incremented exclusively in the case of a successful write process into the data field 217 and the other counter being incremented exclusively in the case of a successful read process out of the data field 217.

In an embodiment, the EtherCAT message 201 can also have datagrams 105 analogously to FIG. 1 in addition to the datagram 205. This means, in particular, that the EtherCAT message 101 of FIG. 1 can be extended with a datagram 205 of FIG. 2. In particular, it can be provided that a datagram head section 109 of FIG. 1 according to datagram head section 209 of FIG. 2 is formed.

Figure 3:
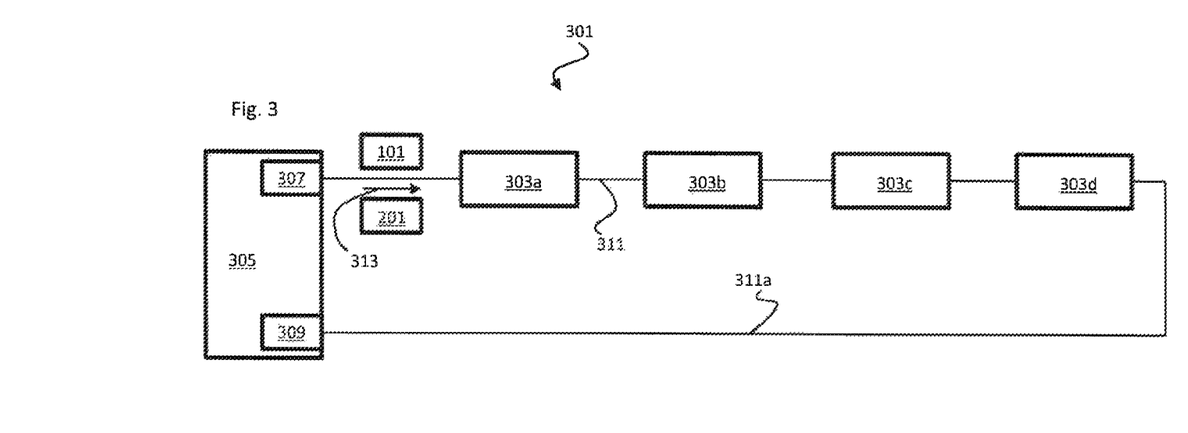
FIG. 3 shows a communication network.

FIG. 3 shows a communication network 301.

The communication network 301 comprises a number of subscribers 303 which are designed to perform the method according to the invention. Four subscribers 303a,b,c,d are shown. However, two, three or more than four subscribers 303a,b,c,d can be provided. The communication network 301 comprises a further subscriber 305 which is configured as master. The four subscribers 303a,b,c,d are configured as slaves. The master 305 and subscribers 303a,b,c,d are connected to one another via a data line 311.

The master 305 has a transmit interface 307 by means of which the master 305 can send messages to the subscribers 303a,b,c,d. Such a message can be, for example, the message 101 of FIG. 1 or the message 201 of FIG. 2. The master 305 comprises a receive interface 309 by means of which the master 305 can receive messages from the subscribers 303a,b,c,d. The transmission of a message via the communication network 301 can be performed, for example, as follows.

The master 305 sends the message 201 (the statements apply analogously to message 101) via its transmit interface 307 to the one of the subscribers 303 which directly follows the master 305 via the data line 311, in this case subscriber 303a. A running direction of the message 201 sent out is shown with an arrow having the reference symbol 313. The message 201 then runs successively in the running direction from left to right through the four subscribers 303a,b,c,d. After running through the fourth subscriber, in this case subscriber 303d, the message 201 is sent back to the master 305 by the last one of the four subscribers, that is to say subscriber 303d. The master receives the message 201 via its receive interface 309.

The first address field 213 of datagram 205 can contain, for example, the address of subscriber 303b. The second address field 215 of datagram 205 can contain, for example, the address of subscriber 303d. The master 305 can preferably perform this addressing. The master 305 can, for example, write data into the data field 217. When the message 201 is transmitted via the communication network 301, that is to say when the message 201 runs through subscribers 303a,b,c,d, the message 201 is received by a subscriber 303b. Subscriber 303b reads the data out of the data field 217 so that the data field 217 is empty after the readout. For example, the data field 217 has a logical zero. The subscriber 303b forwards the message 201 to subscriber 303c. The latter forwards the message 201 to subscriber 303d. Subscriber 303d writes data into the data field 217 and subsequently forwards the message 201 to the master 305. The master 305 receives the message 201 via its receiving interface 309.

In the communication network 301 of FIG. 3, a section 311a of the data line 311 which leads from the last subscriber 303d back to the master 305 no longer runs through the four subscribers 303a,b,c,d. A data exchange is thus possible only in one direction, the running direction. In this embodiment, the subscriber which is to read data out of the data field 217 must therefore be arranged before the subscriber which is to write data into the data field 217, with relation to the running direction. However, this applies only under the premise that data are to be written into an empty data field 217. If a logical combination of the data to be written with data already present in the data field 217 is provided, a position of the subscribers which are intended to write and of the subscribers which are intended to read can be mutually arbitrary.

The four subscribers 303a,b,c,d also have in each case a transmit interface for transmitting and a receive interface for receiving messages.

Figure 4:
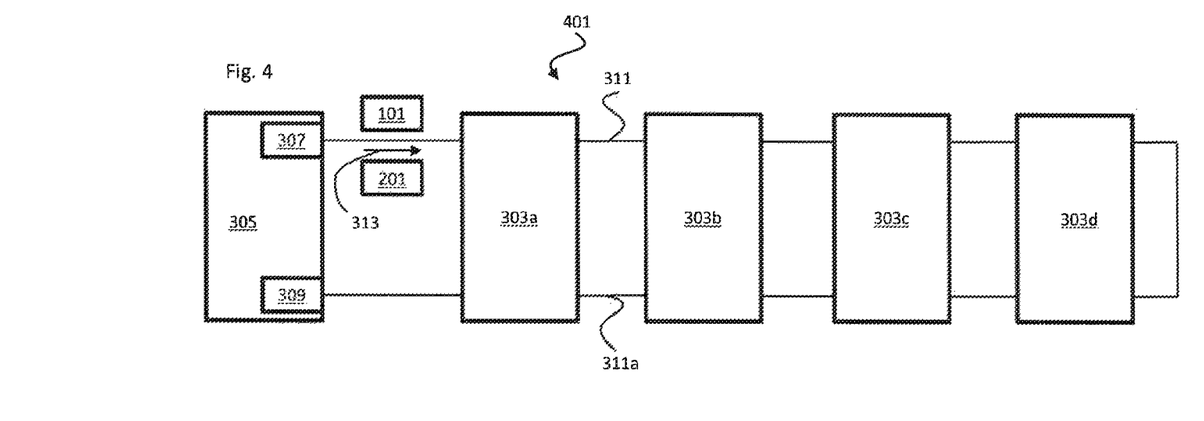
FIG. 4 shows a further communication network.

FIG. 4 shows a further communication network 401.

The communication network 401 is essentially structured analogously to the communication network 301 of FIG. 3. Reference is made to the corresponding statements. As a difference, section 311a of the data line 311, which leads from the last subscriber 303d back to the master 305, runs through the four subscribers 303a,b,c,d on its return path. A data exchange is thus possible both on a forward path of the message 201 from the transmit interface 307 of the master 305 through the subscribers 303a,b,c,d and on a return path from the last subscriber 303d through the four subscribers 303a,b,c,d to the receive interface 309 of the master 305. In this configuration, a positioning of the subscriber which is to read with respect to the subscriber which is to write is therefore arbitrary. This is independent of whether it is intended to write into an empty data field 217 or whether a logical combination between data to be written and data already present in the data field 217 is intended.

Thus, for example, the subscriber which is to read data out of the data field 217 can be the subscriber 303d. The subscriber which is to write data into the data field 217 can be, for example, subscriber 303a. Transmission of the message 201 via the communication network 401 can then be as follows.

The master 305 sends out the message 201 via its transmit interface 307. In the first address field 213 of the datagram 205, the address of the subscriber 303d is located. In the second address field 215 of the datagram 205, the address of subscriber 303a is located. In data field 217, data are located which the subscriber 303d is intended to read. The message 201 successively runs through subscribers 303a,b,c,d. When subscriber 303d receives the message 201, it reads the data out of the data field 217. This may be empty, for example after the readout, and therefore for example have a logical zero. The message 201 then runs via section 311a of the data line 311 again through subscriber 303d, then subscriber 303c, then subscriber 303b and is then received by subscriber 303a. Subscriber 303a writes data into the data field 217 and subsequently sends the message 201 to the master 305 which receives the message 201 by means of its receive interface 309.

Figure 5:
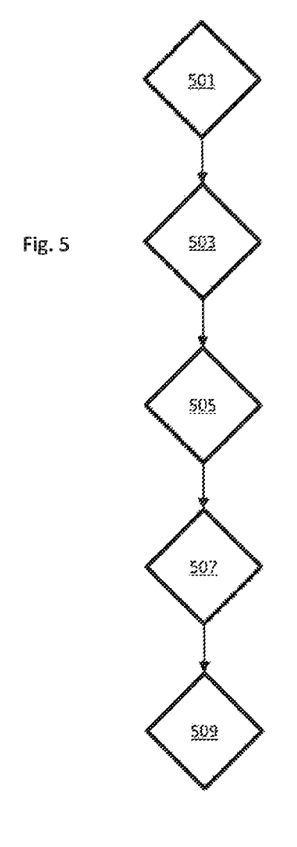
FIG. 5 shows a flow chart of a method for operating a communication network.

FIG. 5 shows a flow chart of a method for operating a communication network which comprises a number of subscribers.

According to a step 501, a message comprising a data field is received by a first subscriber. The message can be formed, for example, analogously to the message 201 of FIG. 2. In a step 503, the first subscriber reads data out of the data field so that the data field is empty after the reading. According to step 505, the first subscriber, after the readout, forwards the message with the empty data field. In a step 507, the message with the empty data field is received by a second subscriber which writes data into the empty data field according to step 509. In one embodiment, it may be provided that after the writing, the second subscriber sends the message to a further subscriber or to a master. The second subscriber can follow the first subscriber directly, for example. Preferably, further subscribers are arranged between the first and the second subscriber so that the message must firstly run through these further subscribers before it reaches the second subscriber.

In an embodiment, the method can also be used for a slave-to-slave communication or in that reading is done by a subscriber and writing is carried out into a subscriber through which the message (frame) runs later.

In one embodiment, the method can be extended in order to provide for a so-called "one-to-many communication." In this embodiment, reading is carried out by a subscriber and writing is performed with several or all following subscribers. For this purpose, the datagram head section (datagram header) 209 is extended by corresponding identifiers. The datagram head section 209 thus has a corresponding identifier. For example, the identifier or the identification can be a broadcast flag and/or a group address.

In one embodiment, it may be provided that data are read by a number of subscribers, the respective data to be read being written in each case into the data field and during this process being logically combined with the data already present in the data field, wherein these logically combined data can be written preferably into a further subscriber. The further subscriber thus reads out the logically combined data. The logical combination can be effected, for example, by ORing the data in the data field 217 of the message 201 with the data to be read out of the subscribers (i.e. the data which are to be written into the data field 217). In principle, for example, other logical and/or arithmetic operations can also be performed or used as logical combination.

According to one aspect, a method for operating a communication network comprising a number of subscribers is provided, wherein a message comprising a data field is transmitted via the communication network, wherein at least one of the subscribers, on receiving the message, reads data out of the data field of the message, forwards them after the readout and wherein at least one other one of the subscribers, on receiving the message, writes data into the data field.

According to another aspect, a communication network is provided comprising a number of subscribers which are configured to perform the method for operating a communication network.

According to another aspect, a computer program is provided which comprises a program code for performing the method for operating a communication network when the computer program is executed on a computer, for example a subscriber.

A common data field in a message is provided in which subscribers of the communication network can both write data and can read data out of the data field. By this means, in particular, an efficient utilization of the data field is advantageously provided. This is because in this manner, for example, the subscribers can exchange data with one another by means of the data field. Thus, a subscriber can write data into the data field which are read out by another subscriber. Thus, a common data field is advantageously available to the subscribers for an exchange of data. The message can thus be used always independently of whether it is sent by a master which, in particular, is also a subscriber to the communication network, to the subscribers, that is to say the slaves, or whether it is sent from the slave to the master. The message can always be used. This is in contrast to the known prior art in which, in dependence on a write or read access of the subscribers, the message remains unused either on the way from the master or on the way back to the master.

In one embodiment, it can be provided that the message has a number of address fields with associated addresses of the subscribers which are to read data out of the data field or write data into the data field. In particular, this causes the technical effect that it is known which subscriber is to read data out of the data field and which subscriber is to write data into the data field. Thus, each subscriber knows when it is receiving the message, whether it is to write data into the data field or read data out of the data field. In particular, this thus means that the address fields have an identifier, for example a flag, which indicates whether the subscriber to which the address of the address field is allocated, is to read data out of the data field or write data into the data field. In particular, an address field can comprise a broadcast flag and/or a group address which indicates that the message is to be processed (reading of data out of the data field and/or writing of data into the data field) by the subscribers which are comprised or addressed by the group address or the broadcast flag.

In a further embodiment, it can be provided that the message has at least one counter which is incremented on reading out of and/or writing into the data field. This produces, for example, the technical effect that a log is kept about a successful read process and/or about a successful write process so that it is also possible subsequently at any time to determine how many write processes and/or read processes are carried out. Such a counter can be designated as a "working counter." The counter is incremented, in particular, only if the read process and/or the write process have been carried out successfully. The counter for read processes, in particular, can be designated as a read counter. The counter for write processes can be designated, for example, as a write counter. If only one counter is provided, it can be designated, in particular, as a read/write counter.

According to a further embodiment, it can be provided that the message has two counters, one counter being incremented exclusively during reading out of the data field and the outer counter being incremented exclusively during the writing into the data field. This produces the technical effect, for example, that an even more accurate log about successful write processes and/or read processes can be kept which can be read out in a particularly simple manner. This is because, due to the two counters, the information is available directly on how many write processes and how many read processes have been carried out.

According to another embodiment, it can be provided that incrementing is carried out with different increments depending on whether reading or writing is performed. In particular, this produces the technical advantage that, for example, only one counter is needed. This is because, from the count, it is possible to calculate back due to the different increments how many write processes and how many read processes have been carried out. In the case of two counters, in particular, the technical effect is produced that specifying the count alone is sufficient for determining whether the corresponding counter is the counter for write processes or the counter for read processes. The counter (read counter or read/write counter) is thus incremented by a first increment in a read process. In a write process, the counter (write counter or read/write counter) is incremented by a second increment. The first increment and the second increment are different.

In a further embodiment, it can be provided that when writing data into the data field, the data to be written are logically combined with data already present in the data field. This produces, for example, the technical effect that further data can be written into the data field although there are already data present in the data field. Combining can comprise, for example, ORing of the data to be written with the data already present. In particular, the combining can also comprise other logical and/or arithmetic operations and/or arbitrary combinations between logical and arithmetic operations between the data to be written and the data already present. The logical operation can comprise, for example, a logical AND in order to determine, for example, advantageously whether all subscribers are in the same state. The arithmetic operation can comprise, for example, an arithmetic SUM in order to, for example, advantageously contrast or combine counters, particularly error counters, to form a total count, particularly a total error count.

According to another embodiment, respectively, it can be provided that
  the message is received by a first subscriber,
    which reads data out of the data field so that the data field is empty after the reading, wherein
  the first subscriber, after the readout, forwards the message with the empty data field wherein
  the message with the empty data field is received by a second subscriber which writes data into the empty data field.

In particular, this produces the technical effect that by means of one message, a read process can be performed efficiently at one subscriber and a write process at a second subscriber, which does not require any configuration of phases in which acyclic communication is provided, and that the master can decide with each resending of the message which subscribers of the communication network it wishes to address. Due to the empty data field, the entire storage space is available to the second subscriber for writing data into the data field. Since in the case of an empty data field, no combining of data to be written with data already present needs to be carried out, a processing time and a computing effort are thus reduced. The message can thus be forwarded advantageously, after the writing of the data into the data field, rapidly and with less delay relative to a processing comprising a combination. In the sense of the present invention, "empty" can mean, for example, that the data field has no content. "Empty" in the sense of the present invention, can mean, for example, that the data field has a logical zero (0) as the only content.

According to one embodiment, it can be provided that a master sends the message to a subscriber, particularly the first subscriber or the second subscriber.

In one embodiment, it can be provided that the subscribers forward a received message to the next subscriber.

In a further embodiment, it can be provided that the subscriber, particularly the first subscriber or the second subscriber, sends the message to a further subscriber, particularly the second subscriber or the first subscriber.

In another embodiment, it can be provided that the subscriber, particularly the first subscriber or the second subscriber, sends the message to the master.

If, according to one embodiment, a data exchange with a message between the subscribers can take place or be performed only in one direction (for example a forward or a reverse direction; forward direction or forward path is the direction from the master to the subscriber, reverse direction or a return path is the direction from the subscriber to the master), it is provided in particular that a subscriber (for example the first subscriber) which is to read data out of the data field, is located before the subscriber (for example the second subscriber), with relation to a direction of data exchange or a running direction of the message, which is to write data into the data field. This is because if no combining is to be performed, the data field must first be empty before data can be written into the data field again. Thus, the data must first be read out of the data field by means of a subscriber (for example first subscriber) before data can be written into the data field by a further subscriber (for example second subscriber). In this embodiment, a data line from the subscriber back to the master no longer runs through the subscribers so that they can no longer receive and process the message on the return path of the message.

If, according to one embodiment, a data exchange can take place or be performed with the message between the subscribers in both directions (that is to say forward and reverse direction), it can be provided in particular that a positioning of a subscriber (for example the first subscriber) which is to read, and of a subscriber (for example the second subscriber) which is to write is arbitrary. In this way, the reading of the data out of the data field can be performed in the forward direction or on the forward path, that is to say the direction from the master in the direction of the subscriber. Writing data into the data field can be performed on the reverse direction or on the return path, that is to say the direction from the last subscriber of the communication network back to the master. In this embodiment, a data line runs from the subscriber back to the master via the subscribers so that the latter can receive and process the message on the return path of the message.

According to one embodiment, it can be provided that the subscribers are subscribers to an automation system or an automation facility. The automation system or facility can comprise, for example, a control system and/or control facility. The subscribers can be preferably subscribers of a control system and/or of a control facility. This means, therefore, that the corresponding system and/or facility mentioned above has a number of subscribers which are connected to one another via a communication network. For example, a data line connects the subscribers to one another. For example, the data line connects the master to the subscribers. Via the communication network, messages can be transmitted so that messages can be forwarded from one subscriber to the next subscriber.

According to one embodiment, the communication network is an Ethernet communication network. The message can be, for example, an Ethernet message.

According to another embodiment, the communication network is an EtherCAT communication network. The message can be, for example, an EtherCAT message.

The message can comprise, for example, a datagram, wherein the datagram can comprise the aforementioned counter or the aforementioned counters and/or the data field and/or the aforementioned address fields. The message can be formed, for example, analogously to the message 201 of FIG. 2 as will still be explained in the text which follows.

According to another embodiment, subscribers can control and/or read out an actuator and/or a sensor, this particularly being based on a received message, particularly being based on data of the data field. This means, therefore, in particular, that a subscriber can control and/or read out an actuator and/or a sensor, this being based on a received message, particularly being based on data of the data field. Thus, for example, a subscriber can write data into the data field which comprise information on a status of the actuator and/or of the sensor. Thus, for example, a subscriber can read data out of the data field which comprise information on how the subscriber is to control the actuator and/or the sensor.

When the subscriber reads data out of the data field, these data read out are preferably written into the subscriber, particularly into a memory of the subscriber and/or of the associated actuator and/or sensor. Thus, reading data out of the data field produces, in particular, writing data into the subscriber, that is to say a write access of the subscriber.

When the subscriber writes data into the data field, these data to be written are read out of the subscriber, in particular, particularly out of a memory of the subscriber and/or of the associated actuator and/or sensor. Writing data into the data field thus produces, in particular, reading data out of the subscriber, that is to say read access of the subscriber.

According to one embodiment, a subscriber can process a received message. Processing can comprise, for example, reading data out of the message, particularly out of the data field. Processing can comprise, for example, writing data into the message, particularly into the data field. The subscriber can, for example, forward the processed message.

According to one embodiment, it can be provided that a subscriber only forwards a received message, that is to say does not process it.

According to one embodiment, the communication network can have a topology selected from the following group of topologies: ring, line, star, tree and a combination thereof.

The statements made in conjunction with the method apply analogously to subscribers and to the communication network and conversely. In particular, this means that embodiments with regard to a subscriber and/or a communication network can result from embodiments with regard to the method and conversely in each possible combination. If the singular is used for "subscriber," the plural should always be read also and conversely.

The invention claimed is:

1. A method for operating a communication network comprising a master and a number of subscribers,
    wherein a message comprising a data field is transmitted by the master,
    wherein a first of the subscribers, on receiving the message,
        reads data out of the data field of the message, so that the data field is empty after reading the data out, and forwards the message with the data field empty to at least one other of the subscribers, after reading the data out, and wherein a second subscriber of the at least one other subscribers, on receiving the message with the empty data field, writes data into the empty data field.

2. The method as claimed in claim 1, wherein the message has a number of address fields, one of the address fields indicating the first subscriber which is to read data out of the data field and another of the address fields indicating the second subscriber of the data field which is to write data into the data field.

3. The method as claimed in claim 1, wherein the message has at least one counter which is incremented on at least one of reading out and writing into the data field.

4. The method as claimed in claim 3, wherein incrementing is carried out with different increments depending on whether reading out or writing is performed.

5. The method as claimed in claim 1, wherein the message has two counters, wherein one counter is incremented exclusively on reading out of the data field and the other counter is incremented exclusively on writing into the data field.

6. The method as claimed in claim 1, wherein during a writing of data into the data field, the data to be written are logically combined with data already present in the data field.

7. A communication network comprising a master and a number of subscribers, the master and the subscribers being connected to one another via a data line, the master comprising a transmit interface to the data line by which the master sends a message to the subscribers and a receive interface to the data line by which the master receives the message from the subscribers after passing through the subscribers, the message comprising a data field wherein a first of the subscribers, on receiving the message, reads data out of the data field of the message so that the data field is empty after reading the data out, and forwards the message with the data field empty, after reading the data out, to at least one other of the subscribers, and wherein a second subscriber of the at least one other subscribers, on receiving the message with the empty data field, writes data into the empty data field of the message.

8. The communication network as claimed in claim 7, wherein the message has a number of address fields, one of the address fields indicating the first subscriber which is to read data out of the data field and another of the address fields indicating the second subscriber of the data field which is to write data into the data field.

9. The communication network as claimed in claim 7, wherein the message has at least one counter which is incremented on at least one of reading out and writing into the data field.

10. The communication network as claimed in claim 9, wherein incrementing is carried out with different increments depending on whether reading out or writing is performed.

11. The communication network as claimed in claim 7, wherein the message has two counters, wherein one counter is incremented exclusively on reading out of the data field and the other counter is incremented exclusively on writing into the data field.

12. The communication network as claimed in claim 7, wherein during a writing of data into the data field, the data to be written are logically combined with data already present in the data field.

13. A method for operating a communication network comprising a master and a number of subscribers, wherein the master transmits a message to the subscribers, the message comprising a data field and at least two address fields associated with the data field and addressing that data field, one address field indicating a first subscriber which is to read data out from the data field and another address field indicating a second subscriber which is to write data into the data field, the second subscriber being located downstream of the first subscriber with respect to a running direction of the message, wherein the second subscriber, on receiving the message with the data field read out by the first subscriber, writes data into the data field of the message, the data field having a storage space read out by the first subscriber, the entire storage space of the data field being available to the second subscriber for writing data into the data field by the second subscriber.

14. The method as claimed in claim 13, wherein the message has at least one counter which is incremented on reading out and on writing into the data field, wherein incrementing is carried out with different increments depending on whether reading or writing is performed.

15. The method as claimed in claim 13, wherein the message has two counters, wherein one counter is incremented exclusively on reading out of the data field and the other counter is incremented exclusively on writing into the data field.

16. The method as claimed in claim 13, wherein during a writing of data into the data field, the data to be written are logically combined with data already present in the data field.

17. The method as claimed in claim 13, wherein the first subscriber reads data out of the one data field of the message so that the one data field is empty after reading the data out, wherein the first subscriber, after reading the data out, forwards the message with the one data field empty, and wherein the message with the empty data field is received by the second subscriber which writes data into the empty data field.

* * * * *